United States Patent
Levy et al.

(10) Patent No.: US 6,616,755 B1
(45) Date of Patent: Sep. 9, 2003

(54) SELF-LEVELLING CONCRETE AND METHOD FOR MAKING A STRUCTURAL PART

(75) Inventors: Christophe Levy, Chatou (FR); Rémy Garcia, Cesson (FR)

(73) Assignee: Lafarge Platres, Avignon (FR)

( * ) Notice: Subject to any disclaimer, the term of this patent is extended or adjusted under 35 U.S.C. 154(b) by 0 days.

(21) Appl. No.: 09/423,314

(22) PCT Filed: May 11, 1998

(86) PCT No.: PCT/FR98/00939

§ 371 (c)(1),
(2), (4) Date: Nov. 12, 1999

(87) PCT Pub. No.: WO98/51638

PCT Pub. Date: Nov. 19, 1998

(30) Foreign Application Priority Data

May 12, 1997 (FR) ............................................. 97 05781
Aug. 6, 1997 (FR) ............................................. 97 10094

(51) Int. Cl.⁷ ......................... C04B 24/00; C04B 28/02; F04B 1/00
(52) U.S. Cl. ....................... 106/808; 106/717; 106/719; 106/724; 106/727; 106/802; 106/806; 106/823
(58) Field of Search .................... 106/717, 719, 106/724, 727, 802, 806, 808, 823; 52/741.1, 742.1, 742.14

(56) References Cited

U.S. PATENT DOCUMENTS 5,403,394 A   4/1995   Burgand
5,614,017 A   3/1997   Shawl

FOREIGN PATENT DOCUMENTS

| DE | 295 18 306 | 7/1996 |
| EP | 0 612 702 | 8/1994 |
| FR | 2 696 736 | 4/1994 |
| FR | 2 704 853 | 11/1994 |
| FR | 2 722 526 | 1/1996 |

OTHER PUBLICATIONS

Patent Abstracts of Japan, vol. 095, No. 011, Dec. 26, 1995 & JP 07–215750 (Nitto Chem. Ind. Co., Ltd.), Aug. 15, 1995.

*Primary Examiner*—Elizabeth D. Wood
(74) *Attorney, Agent, or Firm*—Arent Fox Kintner Plotkin & Kahn PLLC

(57) ABSTRACT

The invention concerns a self-levelling concrete and a method for making a structural part from said concrete. The concrete which comprises aggregate and solid particles with size grading not more than 12 mm, comprises a superplasticizer which is a compound containing a least an amino-(dialkylene phosphonic) group and at least a polyalkylated chain, or one of its salts. The method is implemented by advantageously pumping the concrete using one or several immersion tubes with their injecting end at a lower level than the framework.

56 Claims, 1 Drawing Sheet

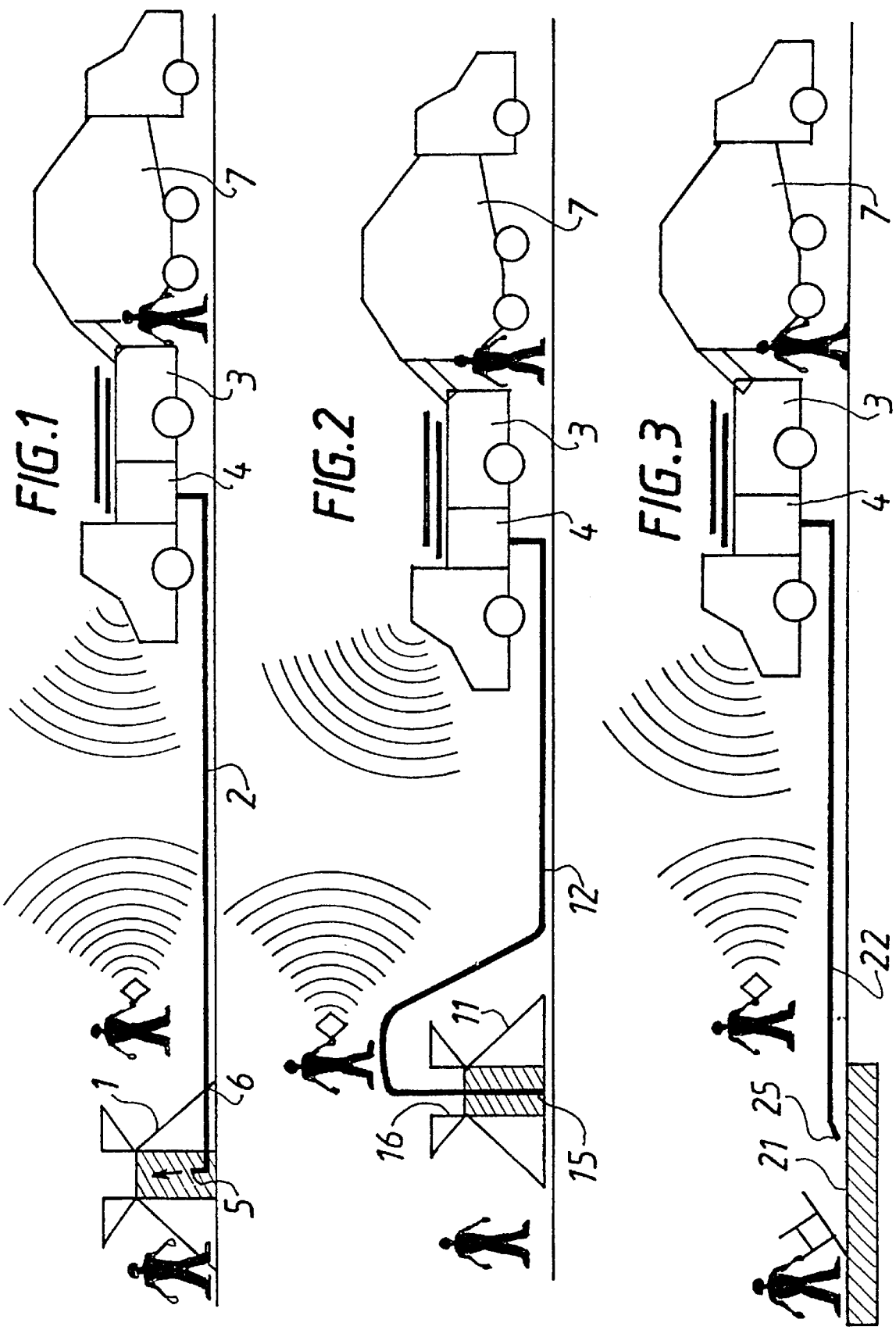

SELF-LEVELLING CONCRETE AND METHOD FOR MAKING A STRUCTURAL PART

This invention relates to a self-levelling concrete enabling to eliminate completely vibrations and surface finishing, as well as to a method for making a structural part from the said concrete, whereas the manufactured parts can be vertical as well as horizontal.

The self-levelling concretes are very fluid concretes than can be placed and tightened under the alone effect of gravity without calling for any vibrations. The self-levelling concretes also produce after hardening a homogeneous end product, which has not undergone any segregation. A description of such concretes can be found in the bibliographic synthesis by Thierry SEDRAN published in Bull.-Labo. P. and Ch., 196, ref. 3889, March–April 1995. A comment of these concretes can also be found in the article by NAGATAKI, <<Concrete Technology in Japan>> (chapter 3), published in Concrete Under Severe Conditions: Environment and Loading (Volume 1), edited by. K. SAKAI, N. BANTHIA and O. E. GJORV, 1995.

The self-levelling concretes notably and advantageously produce materials of a quality not so dependent on the workers' know-how and the quality concrete as well as better steel coating, reduce the implementation durations and the necessary labour during casting, and improve ergonomy.

However surface defects frequently appear, especially macrobubbling.

This invention relates to a self-levelling concrete enabling to obtain better quality facing, avoiding macrobubbling and not requiring any surface finishing.

The invention also relates to such a self-levelling concrete, providing good rheology handling, can be cheap, enables using any cement amongst a wide variety of cements and can be manufactured in a ready-mix concrete plant thanks to a few hours' rheology handling.

The invention also relates to a method for making a structural part from a self-levelling concrete, easy to be implemented, not requiring any cranes, thus providing time to enhance productivity of the building yard and particularly suited for a self-levelling concrete exhibiting the previous qualities.

In the following, the value ranges are inclusive.

The invention applies to a self-levelling concrete of known composition, comprising in weight, for cubic meter of concrete:

about 350 to 600 kg/m$^3$ of binder, of which 200 to 500 kg/m$^3$ are cement, about 170 to 250 kg/m$^3$ of water, about 0.5 to 4 kg m$^3$ of various agents and additives (dry extracts), comprising at least one superplasticizer, the cubic meter supplement, in weight, of granulates and solid particles of size smaller than or equal to 12 mm, preferably smaller than or equal to 8 mm.

According to the invention, the superplasticizer is a hydrosoluble or hydrodispersible organic compound, which comprises at least one amino-di-(alkylene phosphonic) group, optionally as a salt, and at least one polyoxyalkylated chain. More precisely, the superplasticizer is a compound (I) or a salt of said compound (I), wherein this compound has the formula.:

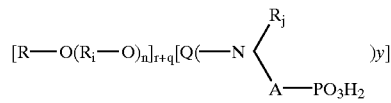

in which:

R is a hydrogen atom or a saturated or unsaturated monovalent hydrocarbon group, comprising 1 to 18 carbon atoms and optionally one or several heteroatoms: R being preferably a hydrogen atom or a monovalent saturated or unsaturated hydrocarbon group comprising 1 to 4 carbon atoms, 50% to 100% of the Ri are ethylene, 0 to 50% of the optional other Ri are similar or different from one another and represent an alkylene such as ethylene, propylene, butylene, amylene, octylene or cyclohexene, or an arylene such as styrene or methylstyrene; whereby the Ri may include one or several heteroatoms, Q is a hydrocarbon group comprising 2 to 18 carbon atoms and optionally one or several heteroatoms, A is an alkylidene group comprising 1 to 3 carbon atoms, A representing preferably the methylene group, The Rj are similar or different from another and can be selected from the A—PO$_3$H$_2$ group, whereas A has the meaning mentioned above, and the group

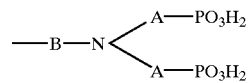

B designating an alkylene group comprising 2 to 8 carbon atoms, B representing preferably ethylene or propylene, A having the above mentioned meaning, <<n>> is a number ranging from 20 and 250, <<r>> is the number of [R—O(R$_i$—O)$_n$] groups of Rj, <<q>> is the number of [R—O(R$_i$—O)$_n$] groups of Q, the sum <<r+q>> should not exceed 3

<<y>> is an integer equal to 1 or 2,

Q, N and the Rj may form together one or several rings, whereas this or these rings may also comprise one or several other heteroatoms.

The salts of the compounds (I) can be stoichiometric or not, mixed or not and consist of alkaline metals, alkaline-earth metals, amines or quaternary ammoniums.

The form of the compounds (I) may vary from liquid to solid, while passing through the wax phase.

The supplement to cement to make up the binder advantageously consists of ground high furnace slag, volatile ashes, filler, calcareous or siliceous or other puzzolanic elements.

The category of the superplasticizers of the self-levelling concrete according to the invention is known in itself generally as a fluidising component for aqueous suspensions of mineral particles and hydraulic binder pastes, and is disclosed in the document FR-A-2.696.736. Moreover, a method for preparing such a fluidising component is described in the document FR-A-2.689.895. However, the use of this fluidising component as a superplasticizer in a self-levelling concrete according to the invention is new. We refer notably to the document FR-A-2,696.736 for a detailed description of the category of the compounds (I) and of the salts of said compounds (I) used as superplasticizers the self-levelling concrete according to the invention.

The self-levelling concrete according to the invention exhibits surprising results, which provide decisive advantages:
- a) it avoids macrobubbling while allowing the bubbles to float up to the surface and thus provides facings of very smooth surface and superior quality, not requiring any surface finishing at a later stage;
- b) it practically exhibits neither segregation nor exudation phenomenon, which consequently enables to avoid the requirement to add a viscosity agent and thus provides cost savings and easier implementation;
- c) the cement contained in the self-levelling concrete according to the invention can be selected from a very wide variety of cements without affecting the qualities of the concrete significantly;
- d) the facing obtained is clear or becomes clear rapidly (for example after a week) in quite numerous cases, even in the presence of a large quantity of volatile ashes or of dark cement, which provides the facing with higher aesthetic quality;
- e) the concrete exhibits good rheology handling, which may generally last 3 hours at least.

The self-levelling concrete according to the invention may also enable vibration-less implementation, practically no exudation, rapid implementation, good pumping capacity and very good vibration-less horizontal levelling property. The concrete can be prepared in a conventional ready-mix plant without modification of this ready-mix plant and can be delivered, ready for use, by mixer trucks to the building yard. If needed, fluidity of the concrete is adjusted by complementary addition of the superplasticizer on the building yard. Thus, the doses of each component of the concrete can thus be regular.

Fluidity of the concrete removes traditionally slumping and levelling operations with a rule or an equivalent means, as well as the floating operation for horizontal concrete works, providing the man of the art adheres to the normal implementation conditions. To obtain a plane and smooth horizontal surface, it suffices to apply slowly a finishing bar over the surface of the fresh product. Indeed, concrete is almost self-smoothing. Besides, maintaining this fluidity for a reasonable duration, from 2 to 4 hours and good setting and hardening kinetics of the concrete, enable people to tread upon the manufactured part as soon as the day following the pouring of the concrete.

During slump flow tests, this concrete enables obtaining a sagging value greater than 70 cm after fluidisation on the yard and notably, preferably, between 73 and 77 cm. An average 28-day strenght at least equal to some 30 Mpas can also be provided.

Concrete, once hardened, becomes a structural part with a good surface aspect, smooth and plane, without requiring any sanding for horizontal parts. In the case of vertical parts, this surface exhibits a thin facing texture, which can meet the characteristics listed in the reference DTU21 (Unified Technical Document).

To meet the requirements of the self-levelling concrete according to the invention, the superplasticizer such as defined previously exhibits advantageously the following characteristics, taken separately or in association with all their technically possible combinations:
- R is a hydrogen atom,
- R is a monovalent saturated or unsaturated hydrocarbon group comprising 1 to 4 carbon atoms,
- the Ri groups are selected from ethylene and propylene,
- Ri is mainly ethylene, whereas the number of ethylene units corresponding to Ri is sufficient in order to keep the hydrosoluble or hydrodispersible property of the compound (I),
- Q is a hydrocarbon group comprising from 2 to 12 and preferably from 2 to 6 carbon atoms and represents preferably ethylene and/or propylene, whereas the latter are provided advantageously in an amount of 95 mole %, the supplement consisting of other monomers such as cyclohexene or n-hexene,
- the alkylidene group A comprises from 1 to 3 carbon atoms,
- A is the methylene group,
- the Rj group is the group —$CH_2$—$PO_3H_2$ optionally as a salt or the group —$C_2H_4N$ ($CH_2$—$PO_3H_2$)$_2$ optionally as a salt or the group —$C_3H_6N$ ($CH_2$—$PO_3H_2$)$_2$ optionally as a salt,
- the salts of the compound (I) are sodium, calcium or diethanolamine salts,
- <<n>> ranges from 20 to 250, preferably from 30 to 150 and more preferably from 50 to 100,
- the sum <<r+q>> is smaller than 3 and preferably equal to 1,
- <<y>> is equal to 1.

Although it is generally not necessary, the self-levelling concrete according to the invention may comprise one or several viscosity agents selected for example from ultrathin silicae or organic compounds such as polysaccharides with high molecular weight such as starches, Xanthan gum, Welan gum or cellulosic derivatives, at the ratio of about 0 to 1 kg/m$^3$ (dry extract) of the composition.

Nevertheless, one of the advantages of the concrete according to the invention is to allow to avoid the use of viscosity agents, which are often costly and difficult to be applied.

Advantageously, the compound (I) used as a superplasticizer in the self-levelling concrete according to the invention comprises one or several characteristics listed below:
- (i) at least 50% of the Ri are ethylene and the other optional Ri are propylene;
- (ii) Rj is selected from the groups —$CH_2$—$PO_3H_2$, —$C_2H_4N$ ($CH_2$—$PO_3H_2$)$_2$ and —$C_3H_6N$ ($CH_2$—$PO_3H_2$)$_2$, optionally as a salt.

Very good results have been obtained with a diphosphonated compound (I) in which Ri is ethylene, Rj is —$CH_2$—$PO_3H_2$. <<n>> ranges from 30 to 150 (inclusive), preferably from 50 to 100 (inclusive), the sum <<r+q>> is equal to 1 and <<y>> is equal to 1.

A compound that has given very good results has the following formula (II):

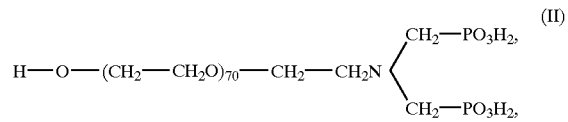

and the salts thereof.

Advantageously, the quantity of the superplasticizer (I) comprising at least one amino-di-(alkylene phosphonic) group and at least one polyoxyalkylated chain, in the self-levelling composition, ranges from 0.2 and 2% in dry weight, based on the cement weight, preferably from 0.3 to 0.8% in dry weight.

According to an alternative embodiment of the self-levelling concrete according to the invention, further to the superplasticizer (I) of the above mentioned formula (I), the composition should comprise at least one hydrosoluble or hydrodispersible superplasticizer (PCP), of polycarboxylic acid type and comprising polyether chains.

These superplasticizers (PCP), which are based on carboxylic vinyle monomers, and optionally, on sulfonated monomers, are well known and are notably described in the U.S. Pat. No. 5.714.017 and the EP-patent 0.612.702.

Preferably, it is provided to vary from 0.1 to 10, the weight ratio of the superplasticizer (I) on the superplasticizer (PCP).

The combination of the superplasticizers (I) and (PCP) enables preparing self-levelling concretes with the requested fluidity and reduced water contents. Moreover, while varying the proportion of superplasticizer (I) with respect to the superplasticizer (PCP), time-related fluidity handling of the cement self-levelling concrete compositions can be modulated.

Preferably, the superplasticizer (PCP) provided in the self-levelling concrete according to the invention comprises polyether chains of various lengths. Advantageously, the superplasticizer (PCP) provided in the self-levelling concrete according to the invention is such that the polyether chains comprise, in average, at least 50% oxyethylene units (percentage expressed on the total of oxyalkylene units of the superplasticizer PCP). Preferably still, the other oxyalkylene units are oxypropylene units.

Advantageously, the self-levelling concrete according to the invention comprises at least one antifoaming agent. The chemical nature of the antifoaming agent is not critical. Preferably, tributylphosphate is chosen. The quantity of antifoaming agent is generally comprised between 0.01 and 0.3% in weight, based on the cement weight.

Advantageously, the self-levelling concrete according to the invention comprises at least one thickener. As regards the thickeners that can be used in the self-levelling concrete object of this invention, mineral compounds can be mentioned such as sepiolite or ultrathin silicae, or organic compounds, such as cellulose derivatives or polysaccharides with high molecular weight, such as Xanthan gum or mixtures of two or more thickeners mentioned above. The quantity of thickener can range from 0.005% to 0.05% in dry weight based on the cement weight.

When an antifoaming agent and, optionally, a thickener are poured in the self-levelling concrete according to the invention these are supplied, advantageously, simultaneously with the superplasticizer (I) into this composition, using a uniform and stable premixture. Preferably, this premixture comprises mainly:
water,
at least one antifoaming agent, not hydrosoluble or hardly hydrosoluble;
at least one superplasticizer (I) complying with the formula (I) and, optionally, another superplasticizer (PCP) hydrosoluble or hydrodispersible,
at least one organic compound (O) comprising:
at least one primary, secondary or tertiary amino group, optionally neutralised, in whole or in part, by an organic or mineral Brönsted acid; and
at least one alkyl or alkyl-aryl chain, linear or branched, saturated or unsaturated, comprising at least 8 carbon atoms, and optionally heteroatoms, selected from oxygen, sulphur or nitrogen;
at least one mineral stabiliser when the pH-acidity of the said premixture is greater than 7, such as clays and sepiolites;
optionally, an acid or a base to adjust the pH of the said mixture.

In this premixture:
by <<antifoaming agent>>, not hydrosoluble or hardly hydrosoluble, should be understood an antifoaming agent, weakly or not soluble in aqueous media at room temperature (about 20° C.) and at atmospheric pressure;
by <<uniform mixture>> should be understood a mixture which, left to set, may range from a limpid mixture (such as a microemulsion) to a troubled mixture (such as an oil in water emulsion). Sometimes, a thin film, generally foam, can be present at the surface of the uniform mixture.

The organic compound (O) is preferably selected from oleic amine, coco-nut oil amine, tallow amine and the derivatives of these amines, in particular the derivatives of these amines with an oxyethylene unit or a chain containing no more than 8 oxyethylene units.

The invention also relates to a method for making a vertical structural part by injecting a self-levelling concrete according to the invention into a framework. In this method, the concrete is pumped in fluid form using at least one immersion tube with an injection end at a lower level than the framework.

This method, particularly suited to the self-levelling concrete according to the invention, enables homogeneous filling of the framework and avoids cumbersome devices and calling for tedious handling.

Preferably, the diameter of the immersion tube ranges between 35 mm and 65 mm, and is advantageously equal to 50 mm.

According to a first preferred embodiment of this method, the immersion tube is inserted into the framework through an upper opening in the framework.

In a second embodiment of this method, the immersion tube goes through the framework at the lower level of the framework. The workers' task is therefore made easier and they have direct access to insertion orifices, to the tube, notably for very reinforced shells or very thin posts.

The invention also relates to a method for making a horizontal structural part by injecting a self-levelling concrete according to the invention into a plane framework or on a particular ground. In this method, after injection, a smoothing bar is applied regularly over the surface of the concrete in order to ensure surface evenness of the part.

There is no need for using a ground finishing product.

Other advantages and objects of the invention will appear more clearly when reading the examples given below for illustrative purposes, without being limited to the said, with reference to the appended figures on which:

FIG. 1 represents a first embodiment for casting a self-levelling concrete according to the invention.

FIG. 2 represents a second embodiment for casting a self-levelling concrete according to the invention.

FIG. 3 represents a third embodiment for casting a self-levelling concrete according to the invention.

A self-levelling concrete according to the invention can be cast in several ways, whereas the implementation method is advantageously suited to the structural part to be made.

In a first embodiment, represented on FIG. 1, the concrete is injected into a mold 1 using an immersion tube 2 which goes through the mold 1 via an opening 6 located in the lower section of the mold 1, close to the ground or the supporting plane. Thus, the tube 2 has an end 5 arranged at the bottom of the mold 1. This embodiment is particularly suited to the construction of very reinforced shells or posts.

In an example of this first embodiment, the concrete is poured for example from a mobile concrete mixer 7 into a hopper 3 of 8 m³ capacity and the concrete is injected via a pump 4 into the mold 1 through the immersion tube 2, as represented on FIG. 1. The tube 2 is a flexible hose, smaller than 50 mm in inner diameter and 60 m in length.

In a second embodiment, represented on FIG. 2, the concrete is injected into a mold 11 using an immersion tube 12, which is inserted into the mold 11 via an upper opening 16 of the mold 11 and with an end 15 extending down to the bottom of the mold 11. This embodiment is particularly suited to the realisation of shells.

For exemplification purposes, the tube 12 is a flexible hose with 50 m horizontal section, a 15 m vertical section and a 65 mm inner diameter. In an alternative embodiment, the tube 12 is a rigid hose, having for example a 65 mm inner diameter.

In an alternative embodiment, the tube 12 is a rigid hose, optionally round to facilitate its insertion into dense reinforcements.

In a third embodiment, represented on FIG. 3, the concrete is injected into a horizontal framework 21 or directly into a ground reinforcement. This injection is performed using a horizontal tube 22 protruding just above the framework 21 with an end 25. Preferably, a finishing bar is applied to provide good surface evenness, avoiding any ground finishing. This third embodiment is particularly suited to the construction of slabs and of footings.

Examples of compositions of self-levelling concretes according to the invention will be given hereafter.

EXAMPLE 1

A self-levelling concrete of the following formula is made:
cement CEM I: 270 kg/m³,
water: 218 l/m³,
volatile ashes: 210 kg/m³,
granulates and flying solid particles with size smaller than 8 mm: 1465 kg/m³,
superplasticizer: 3.3 kg/m³, i.e. 0.99 kg/m³, in dry extract,
air entraining agent: 0.27 kg/m³.

The superplasticizer used is the compound of formula (II).

In order to cast concrete, the first embodiment (FIG. 1), is used in the following conditions. The mold 1 having a 2.5 M³ volume, the concrete is injected via the tube 2 that consists of a 60 m long flexible hose and having a 50 mm inner diameter. The pump 4 has a 5 m³/h flow rate and applies a 5 bar pressure.

With this implementation, a slump flow equal to 74 cm is measured during a slump flow test and air entraining in the order of 3.5%. The facing obtained is of very good quality and exhibits only a small area with very light bubbles in the lower section below the insertion area of the tube 2.

EXAMPLE 2

A self-levelling concrete of the following formula is made:
cement CEM I: 270 kg/m³,
water: 230 l/m³,
ashes: 210 kg/m³,
granulates 0/1: 365 kg/m³,
granulates 0/5: 365 kg/m³,
granulates 3/8: 735 kg/m³,
superplasticizer: 2.34 kg/m³, i.e. 0.7 kg/m³, in dry extract,
air entraining agent: 0.27 kg/m³.

In this example, the superplasticizer used is the compound of formula (II).

The process is similar to the example 1, but with a pumping rate ranging between 15 m³/h and 25 m³/h. During implementation, a pulverised releasing agent is added. The releasing operation is conducted for some fifteen hours during the removal of the framework.

The slump flow measured is then in the order of 75 cm during the slump flow test.

EXAMPLE 3

In this example, a highly reinforced facing shell is constructed, having 15 m in length, 2.5 m in height and 16 cm in thickness. The shell comprises four windows and a French window.

A self-levelling concrete of the following formula is made:
cement CEM I: 270 kg/m³,
water: 226 l/m³,
volatile ashes: 210 kg/m³,
finest sand: 245 kg/m³,
granulates 0/5: 500 kg/m³,
granulates 3/8: 740 kg/m³,
superplasticizer: 1.2% in weight of the cement.

The superplasticizer used is the compound of formula (II).

In a first embodiment, 0.9% in weight of the cement is supplied in a first stage into the mixer plant, in the mixing water. Upon arrival on the building yard, a sagging test with Abrams cone gives the following values: 25 cm sagging and 62 cm slump flow. Superplasticizer representing 0.3% in weight of the cement is added and the composition obtained is mixed by rotating a mixer of a mixer truck. The mixer is thus rotated for about 1 min/m³ for good homogenisation of the mixture. While repeating the sagging test, slump flow amounts to 77 cm and the slump duration at 60 cm last less than 1 s. Air trapped in the concrete is also measured, i.e. 3% in weight of concrete.

In a second embodiment, instead of carrying out a second fluidifying step on the building yard as in the first embodiment, the whole superplasticizer (1.2% of the cement) is supplied to the mixer plant. The self-levelling concrete is advantageously transported in the mixer truck, either by using plugs on this mixer truck or by underloading the latter.

When implementing the concrete, a releasing agent is pulverized in the form of an aqueous phase emulsion, for example of the type marketed under the name Aquadem.

Preferably, a pump is used, providing a continuous injection flow. Such a pump may for instance consist of a rotor pump comprising a hose having about a diameter of 100 cm.

The concrete obtained after hardening comprises good quality facing both for macrobubbling and microbubbling or formation of rootlets.

EXAMPLE 4

A structural part similar to that of the example 3 is made with similar implementation. The self-levelling concrete used in this example has the following formula:
cement CEM I: 245 kg/m³,
water: 219 l/m³,
volatile ashes: 230 kg/m³,
finest sand: 228 kg/m³,
granulates 0/5: 500 kg/m³, granulates 3/8: 740 kg/m³, superplasticizer: 1.2% in weight of the cement.

The superplasticizer used is the compound of formula (II).

The superplasticizer is supplied in two steps, while adding to the mixture 0.8% in weight of the cement at the mixer plant and 0.4% in weight of the cement upon arrival at the building yard. Before adding the superplasticizer on the building yard, during a slump flow test 23 cm sagging and 50 cm slump flow values are obtained. After adding the superplasticizer, during a sagging test, 72 cm slump flow and about 1s slump flow duration at 60 cm are obtained.

The transport duration of the self-levelling concrete amounts to one hour, without affecting the rheology of the concrete.

Pumping and releasing are performed as in the example 3.

The hardened concrete obtained has a good quality facing, which does not exhibit any macrobubbling.

EXAMPLE 5

The part made and the implementation in this example are similar to those of examples 3 and 4. The self-levelling concrete has the following formula:

cement CEM I: 270 kg/m³, water: 218 l/m³, volatile ashes: 210 kg/m³, finest sand GSI: 245 kg/m³, granulates 0/5: 500 kg/m³, granulates 3/8: 740 kg/m³, superplasticizer: 1.3% in weight of the cement.

The superplasticizer used is the compound of formula (II).

As in examples 3 and 4, good quality facing can be obtained, which does not require any surface finishing.

EXAMPLE 6

In this example, the structural part made and the implementation of the manufacturing method are similar to those of examples 3 to 5. The made self-levelling concrete has the following formula:

cement CEM I: 270 kg/m³, water: 230 l/m³, volatile ashes: 210 kg/m³, finest sand: 365 kg/m³, granulates 0/5: 365 kg/m³, granulates 3/8: 735 kg/m³, superplasticizer: 1.2% in weight of the cement.

air entraining agent: 0.1% in weight of the cement.

The superplasticizer used is the compound of formula (II).

The superplasticizer is supplied into the mixture in two steps, while adding 0.8% in weight of cement to the mixer plant and 0.4% in weight of cement on the building yard. The sagging test upon arrival at the building yard before addition of the superplasticizer gives the following values: sagging 23 cm and slump flow 51 cm. 4.6% air is trapped inside the concrete. After addition of the superplasticizer, a sagging test produces 74 cm slump flow and slump flow duration at 60 cm equal to 1 second. Air trapped after addition of the superplasticizer account for 4.4% of the concrete.

At implementation, the releasing agent added is a product entirely of vegetal origin (oil), for example of the type marketed under the name Bio 2, which is pulverised.

Good quality facing is obtained, exhibiting excellent bubbling properties.

In the examples 3 to 6, the concrete is injected preferably using an immersion tube inserted into the mold via an upper opening (FIG. 2).

EXAMPLE 7

A right-angle structural part is made, having 2.7 m in height, 1.25 m both sides and 18 cm in thickness.

The self-levelling concrete has the following formula:

cement CEM I: 270 kg/m³, water: 216 l/m³, volatile ashes: 210 kg/m³, granulates 0/1: 366 kg/m³, granulates 0/5: 366 kg/m³, granulates 5/12: 807 kg/m³, superplasticizer: 4.05 kg/m³, air entraining agent: 0.27 kg/m³.

The superplasticizer used is the compound of formula (II).

The whole superplasticizer is supplied to the mixer plant. Transportation of the self-levelling concrete lasts approximately 3 hours after which good rheology handling can be observed. The pump used is preferably a pump that provides continuous injection flow.

During a sagging test carried out on the building yard, the slump flow observed is equal to 68 cm after 30 minutes and 70 cm after 60 minutes.

The facing obtained once the concrete has hardened contains eight bubbles with size greater than 2 mm, whereas the largest bubble measures 5 mm. The properties obtained are therefore quite satisfactory.

EXAMPLE 8

In this example, the structural part made and the implementation are similar to those of example 7. The formula of the self-levelling concrete differs from that on example 7 by the quantity of superplasticizer, equal to 5.4 kg/m³, and by the presence of a viscosity agent consisting of Welan gum, 0.05 kg/m³.

During the sagging test, the slump flow observed is equal to 68 cm after 30 seconds and 75 cm after 60 seconds.

The facing obtained once the concrete has hardened is of excellent quality. Indeed, the largest size of bubbles present on this facing is 2 mm.

EXAMPLE 9

In this example, the structural part made is a concrete shell similar to example 7 with the following concrete formula:

| | |
|---|---|
| Cement CEM I | 300 kg/m³ |
| Water | 225 kg/m³ |
| Volatile ashes | 190 kg/m³ |
| Granulates 0/1 | 180 kg/m³ |
| Granulates 0/5 | 600 kg/m³ |
| Granulates 3/8 | 725 kg/m³ |
| Superplasticizer | 4.6 kg/m³ |

The superplasticizer used is the compound of formula (II).

EXAMPLE 10

This example is similar to example 9 above, on the basis of the same concrete composition, whereby 50% superplasticizer II in weight have been replaced with a superplasticizer in the form of premixture of the following formula:

| | |
|---|---|
| Superplasticizer II | 14% |
| Tributylphosphate | 2.25% |
| Oxyethylenated fat amine NORAMOX O22 by CECA | 2.25% |
| Sepiolite | 1.2% |
| PCP 18792 by BOZETTO | 50% (30% in dry condition) |
| Diethanolamine | 5.6% (30% in dry condition) |
| Thickener <<Tylose 60 000 YP4>> by HOECHST | 2.25% |
| Water | 28.62% |

Excellent fluidity is obtained during the sagging test, with the following values: slump flow 70 cm after 30 minutes and 61 cm after 150 minutes. The density of concrete amounts to 2.28.

The aspect of the facing is excellent. Exudation is not found.

What is claimed is:

1. A self-leveling concrete of composition, comprising in weight, for cubic meter of concrete:
   about 350 to 600 kg/m³ of binder, of which 200 to 500 kg/m³ are cement,
   about 170 to 250 kg/m³ of water,
   about 0.5 to 4 kg/m³ of at least one antifoaming and/or thickening agent and/or admixture including at least one superplasticizer,
   cubic meter supplement, in weight, of granulates and solid particles of size smaller than or equal to 12 mm;
   wherein the superplasticizer is a compound (I) or a salt of said compound (I), wherein the compound has the formula:

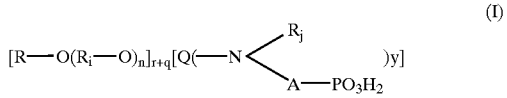

in which:
   R is a hydrogen atom or a saturated or unsaturated monovalent hydrocarbon group, comprising 1 to 18 carbon atoms and optionally one or several heteroatoms, 50% to 100% of the Ri are ethylene, the remaining 0 to 50% of Ri represent at least one alkylene selected from the group comprising ethylene, propylene, butylene, amylene, octylene, cyclohexene and arylene, whereby the Ri may include one or several heteroatoms;
   Q is a hydrocarbon group comprising 2 to 18 carbon atoms and optionally one or several heteroatoms;
   A is an alkylidene group comprising 1 to 3 carbon atoms;
   Rj are similar or different from another and can be selected from
   the A—PO$_3$H$_2$ group, wherein A is an alkylidene group comprising 1 to 3 carbon atoms,
   and the group

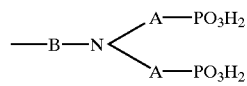

B is an alkylene group comprising 2 to 8 carbon atoms and A is an alkylidene group comprising 1 to 3 carbon atoms,
   <<n>> is a number ranging from 20 and 250,
   <<r>> is the number of R—O(R$_i$—O)$_n$ groups of Rj,
   <<q>> is the number of R—O(R$_i$—O)$_n$ groups of Q,
   the sum <<r+q>> should not exceed 3,
   <<y>> is an integer equal to 1 or 2,
   Q, N and Rj may form together at least one ring, whereas the at least one ring may also comprise one or several additional heteroatoms.

2. The self-leveling concrete according to claim 1, the cubic meter supplement, in weight, of granulates and solid particles of size smaller than or equal to 8 mm.

3. The self-leveling concrete according to claim 1 wherein B is ethylene or propylene.

4. The self-leveling concrete according to claim 1 wherein R is a hydrogen atom or a monovalent saturated or unsaturated hydrocarbon group comprising 1 to 4 carbon atoms.

5. The self-leveling concrete according to claim 1 wherein R is a hydrogen atom.

6. The self-leveling concrete according to claim 1 wherein R is a monovalent saturated or unsaturated hydrocarbon group comprising 1 to 4 carbon atoms.

7. The self-leveling concrete according to claim 1 wherein 50% of the Ri are ethylene, whereas the number of ethylene units corresponding to Ri is sufficient to maintain the hydrosoluble or hydrodispersible property of the compounds (I).

8. The self-leveling concrete according to claim 1 wherein Q is a hydrocarbon group comprising 2 to 12 carbon atoms.

9. The self-leveling concrete according to claim 8 wherein Q is a hydrocarbon group comprising 2 to 6 carbon atoms.

10. The self-leveling concrete according to claim 9 wherein Q is ethylene or propylene provided in an amount of 95 mole %, the supplement consisting of other monomers.

11. The self-leveling concrete according to claim 1 wherein A is a methylene group.

12. The self-leveling concrete according to claim 1 wherein the Rj group is —CH$_2$—PO$_3$H$_2$, C$_2$—H$_4$N (CH$_2$—PO$_3$H$_2$)$_2$, C$_2$—H$_6$N (CH$_2$—PO$_3$H$_2$)$_2$, or salts thereof.

13. The self-leveling concrete according to claim 1 wherein the salts are sodium, calcium or diethanolamine salts.

14. The self-leveling concrete according to claim 1 wherein <<n>> ranges from 20 to 250.

15. The self-leveling concrete according to claim 14 wherein <<n>> ranges from 30 to 150.

16. The self-leveling concrete according to claim 15 wherein <<n>> ranges from 50 to 100.

17. The self-leveling concrete according to claim 1 wherein the sum <<r+q>> is less than 3 or equal to 1.

18. The self-leveling concrete according to claim 1 wherein at least 50% of Ri are ethylene and the remaining Ri are propylene.

19. The self-leveling concrete according to claim 1 wherein in the diphosphonated compound (I), Ri is ethylene, Rj is —CH$_2$—PO$_3$H$_2$, <<n>> ranges from 30 to 150, the sum <<r+q>> is equal to 1 and <<y>> is equal to 1.

20. The self-leveling concrete according to claim 19 wherein <<n>> ranges from 50 to 100.

21. The self-leveling concrete according to claim 1 wherein the superplasticizer is the compound of the following formula (II)

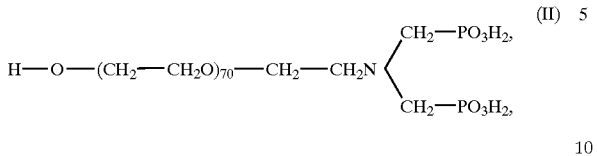

or a salt thereof.

22. The self-leveling concrete according to claim 1 wherein the quantity of the superplasticizer (I) comprising at least one amino-di-(alkylene phosphonic) group and at least one polyalkylated chain, in the self leveling composition, ranges from 0.2 and 2% in dry weight, based on the cement weight.

23. The self-leveling concrete according to claim 22 wherein the quantity of the superplasticizer ranges from 0.3 to 0.8% in dry weight, based on the cement weight.

24. The self-leveling concrete according to claim 1 wherein the concrete comprises further to the superplasticizer (I) of formula (1), at least one hydrosoluble or hydrodispersible superplasticizer (PCP) comprising polyether chains.

25. The self-leveling concrete according to claim 24 wherein the hydrosoluble or hydrodispersible superplasticizer (PCP) comprises carboxylic vinyl monomers, and optionally, on sulfonated monomers.

26. The self-leveling concrete according to claim 24 or 25 wherein the hydrosoluble or hydrodispersible superplasticizer comprises polyether chains, wherein the polyether chains comprise, on average, at least 50% of oxyethylene units, the percentage based on the total of oxyalkylene units of the superplasticizer (PCP).

27. The self-leveling concrete according to claim 26 wherein those oxyalkylene that are other than oxyethylene units are oxypropylene units.

28. The self-leveling concrete according to claim 24 wherein the weight ratio of the superplasticizer (I) to the superplasticizer (PCP) ranges from 0.1 to 10.

29. The self-leveling concrete according to claim 1 wherein the concrete comprises at least one antifoaming agent, in amount ranging between 0.01 and 0.3% in weight, based on the cement weight.

30. The self-leveling concrete according to claim 1 wherein the concrete comprises at least one thickener, whereby the quantity of thickener ranges from 0.005% to 0.05% in dry weight based on the cement weight.

31. The self-leveling concrete according to claim 30 wherein the thickener is a mineral compound, anorganic compound or mixture thereof.

32. The self-leveling concrete according to claim 31 wherein the organic compound is a polysaccharide of high molecular weight selected from the group consisting of xantham gum, welam gum, starches and cellulosic derivatives.

33. The self-leveling concrete according to claim 31, wherein the mineral compound is selected from the group consisting of sepiolite and ultrathin silicae.

34. The self-leveling concrete according to any one of claim 31 to 33, wherein the supplement to cement to make up the binder comprises high ground high furnace slag, volatile ashes, fume silica, silicious filler, calcareous fillers and silico-calcareous fillers.

35. The self-leveling concrete according to claim 1, comprising at least one of the following:

the Rj group is —$CH_2$—$PO_3H_2$, $C_2$—$H_4N$ ($CH_2$—$PO_3H_2)_2$, $C_2$—$H_6N$ ($CH_2$—$PO_3H_2)_2$ or a salt thereof;

at least 50% of Ri are ethylene and the remaining Ri are propylene;

the diphosphonated compound (I), Ri is ethylene, Rj is —$CH_2$—$PO_3H_2$; <<n>> ranges from 30 to 150, the sum <<r+q>> is equal to 1 and <<y>> is equal to 1;

the superplasticizer is the compound of the following formula (II)

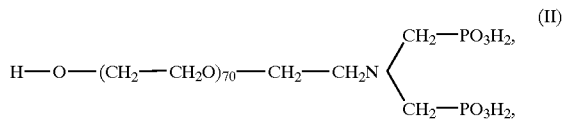

or a salt thereof;

the quantity of the superplasticizer (I) comprising at least one amino-di-(alkylene phosphonic) group and at least one polyalkylated chain, in the self leveling composition, ranges from 0.2 and 2% in dry weight, based on the cement weight;

the concrete comprises further to the superplasticizer (I) of formula (I), at least one hydrosoluble or hydrodispersible superplasticizer (PCP) of polycarboxylic acid type and comprising polyether chains;

the concrete comprises at least one antifoaming agent, in amount ranging between 0.01 and 0.3% in weight, based on the cement weight;

the concrete comprises at least one thickener, whereby the quantity of thickener ranges generally from 0.005% to 0.05% in dry weight based on the cement weight.

36. The method for making a vertical structural part comprising injecting into a framework, a self-leveling concrete of composition, comprising in weight, for cubic meter of concrete:

about 350 to 600 kg/m$^3$ of binder, of which 200 to 500 kg/m$^3$ are cement, about 170 to 250 kg/m$^3$ of water, about 0.5 to 4 kg/m$^3$ of at least one antifoaming and/or thickening agent and/or admixture including at least one superplasticizer, cubic meter supplement, in weight, of granulates and solid particles of size smaller than or equal to 12 mm; wherein the superplasticizer is a compound (I) or a salt of said compound (I), wherein the compound has the formula:

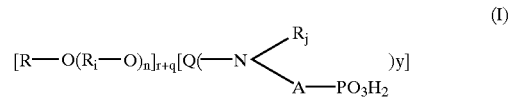

in which:

R is a hydrogen atom or a saturated or unsaturated monovalent hydrocarbon group, comprising 1 to 18 carbon atoms and optionally one or several heteroatoms, 50% to 100% of the Ri are ethylene, the remaining 0 to 50% of Ri represent at least one alkylene selected from the group comprising ethylene, propylene, butylene, amylene, octylene, cyclohexene and arylene, whereby the Ri may include one or several heteroatoms;

Q is a hydrocarbon group comprising 2 to 18 carbon atoms and optionally one or several heteroatoms;

A is an alkylidene group comprising 1 to 3 carbon atoms;
Rj are similar or different from another and can be selected from
the A—PO$_3$H$_2$ group, wherein A is an alkylidene group comprising 1 to 3 carbon atoms,
and the group

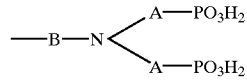

B is an alkylene group comprising 2 to 8 carbon atoms and A is an alkylidene group comprising 1 to 3 carbon atoms, <<n>> is a number ranging from 20 and 250, <<r>> is the number of R—O(R$_i$—O)$_n$ groups of Rj, <<q>> is the number of R—O(R$_i$—O)$_n$ groups of Q, the sum <<r+q>> should not exceed 3, <<y>> is an integer equal to 1 or 2, Q, N and Rj may form together at least one ring, whereas the at least one ring may also comprise one or several additional heteroatoms.

37. The method of making according to claim 36, the injecting comprises pumping the concrete in fluid form into the framework with at least one immersion tube having an injection end.

38. The method of making according to claim 37, wherein the diameter of the immersion tube ranges from 45 mm to 65 mm.

39. The method according to claim 38, wherein the diameter of the immersion tube is 50 mm.

40. The method of making according to claim 37, wherein the immersion tube is inserted into the framework through an upper opening in the framework.

41. The method of making according to claim 37, wherein the immersion tube is inserted into the framework at a level lower than the framework.

42. The method for making a horizontal structural part, comprising injecting into a plane framework or on a particular ground, a self-leveling concrete of composition, comprising in weight, for cubic meter of concrete:
    about 350 to 600 kg/m$^3$ of binder, of which 200 to 500 kg/m$^3$ are cement,
    about 170 to 250 kg/m$^3$ of water,
    about 0.5 to 4 kg/m$^3$ of at least one antifoaming and/or thickening agent and/or admixture including at least one superplasticizer,
    cubic meter supplement, in weight, of granulates and solid particles of size smaller than or equal to 12 mm;
    wherein the superplasticizer is a compound (I) or a salt of said compound (I), wherein the compound has the formula:

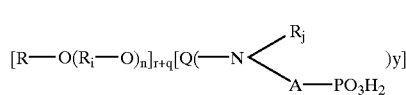 (I)

in which:
    R is a hydrogen atom or a saturated or unsaturated monovalent hydrocarbon group, comprising 1 to 18 carbon atoms and optionally one or several heteroatoms, 50% to 100% of the Ri are ethylene, the remaining 0 to 50% of Ri represent at least one alkylene selected from the group comprising ethylene, propylene, butylene, amylene, octylene, cyclohexene and arylene, whereby the Ri may include one or several heteroatoms;

Q is a hydrocarbon group comprising 2 to 18 carbon atoms and optionally one or several heteroatoms;

A is an alkylidene group comprising 1 to 3 carbon atoms;

Rj are similar or different from another and can be selected from
    the A—PO$_3$H$_2$ group, wherein A is an alkylidene group comprising 1 to 3 carbon atoms,
    and the group

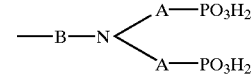

B is an alkylene group comprising 2 to 8 carbon atoms and A is an alkylidene group comprising 1 to 3 carbon atoms, <<n>> is a number ranging from 20 and 250, <<r>> is the number of R—O(R$_i$—O)$_n$ groups of Rj, <<q>> is the number of R—O(R$_i$—O)n groups of Q, the sum <<r+q>> should not exceed 3, <<y>> is an integer equal to 1 or 2, Q, N and Rj may form together at least one ring, whereas the at least one ring may also comprise one or several additional heteroatoms;
    wherein after injection a smoothing bar is applied regularly over the surface of the concrete in order to ensure surface evenness of the part.

43. A method for preparing a composition of self-leveling concrete according to claim 1, comprising formulating a premixture wherein the premixture contains water,
    at least one antifoaming agent, not hydrosoluble or hardly hydrosoluble;
    at least one superplasticizer (I) complying with the formula (I) and,
    optionally, another superplasticizer (PCP) hydrosoluble or hydrodispersilbe,
    at least one organic compound (O) comprising:
        at least one primary, secondary or tertiary amino group, optionally neutralized, in whole or in part, by an organic or mineral Bronsted acid; and
        at least one alkyl or alkyl-aryl chain, linear or branched, saturated or unsaturated, comprising at least 8 carbon atoms, and optionally heteroatoms, selected from oxygen, sulphur or nitrogen;
    at least one mineral stabiliser when the pH-acidity of the said premixture is greater than 7; and
    optionally, an acid or a base to adjust the pH of the mixture.

44. The method according to claim 43, wherein the premixture comprises:
    water,
    at least one antifoaming agent, not hydrosoluble or hardly hydrosoluble;
    at least one superplasticizer (I) of formula (I), and optionally an additional hydrosoluble or hydrodispersible superplasticizer (PCP),
    at least one organic compound (O) comprising:
        at least one primary, secondary or tertiary amino group, optionally neutralized, in whole or in part, by an organic or mineral Brönsted acid; and at least one alkyl or alkyl-aryl chain, linear or branched, saturated or unsaturated, comprising at least 8 carbon atoms, and optionally heteroatoms selected from oxygen, sulphur or nitrogen;

at least one mineral stabilizer when the pH-acidity of the said premixture is greater than 7;

optionally, an acid or a base to adjust the pH of the said mixture.

45. The method according to claim 44, wherein the mineral stabilizer is a clay or sepiolite.

46. The method according to claim 44, wherein the antifoaming agent is an antifoaming agent that is weakly or not soluble in aqueous media at room temperature of about 20° C. and at atmospheric pressure.

47. The method according to claim 44, wherein the organic compound (O) is an amine selected from the group consisting of oleic amine, coco-nut oil amine, tallow amine, or derivatives thereof.

48. The method according to claim 47, wherein the amine derivative comprises an oxyethylene unit or a chain containing no more than 8 oxyethylene units.

49. The method according to claim 46, wherein the organic compound (O) is an amine selected from the group consisting of oleic amine, coco-nut oil amine, tallow amine, or derivatives thereof.

50. The method according to claim 49, wherein the amine derivative comprises an oxyethylene unit or a chain containing no more than 8 oxyethylene units.

51. The method according to claim 42, comprising preparing a uniform mixture, wherein the mixture, when left to set, may range from a microemulsion to [a troubled mixture including] an oil in water emulsion.

52. The method according to claim 43, comprising preparing a uniform mixture, wherein the mixture, when left to set, may range from a microemulsion to an oil in water emulsion.

53. The self-leveling concrete according to claim 1 wherein R is an arylene selected from the group consisting of styrene and methylstyrene.

54. The self-leveling concrete according to claim 10 wherein the monomers arylene are cyclohexene or n-hexene.

55. The method according to claim 36 wherein R is an arylene selected from the group consisting of styrene and methylstyrene.

56. The method according to claim 42 wherein R is an arylene selected from the group consisting of styrene and methylstyrene.

* * * * *